(12) United States Patent
Pinnock

(10) Patent No.: US 6,285,024 B1
(45) Date of Patent: Sep. 4, 2001

(54) COMBINED TORQUE AND ANGULAR POSITION SENSOR

(75) Inventor: Robert Andrew Pinnock, Birmingham (GB)

(73) Assignee: TRW Lucas Varity Electric Steering Ltd. (GB)

(*) Notice: Subject to any disclaimer, the term of this patent is extended or adjusted under 35 U.S.C. 154(b) by 0 days.

(21) Appl. No.: 09/402,143

(22) PCT Filed: Jan. 28, 1999

(86) PCT No.: PCT/GB99/00301

§ 371 Date: Nov. 26, 1999

§ 102(e) Date: Nov. 26, 1999

(87) PCT Pub. No.: WO99/39169

PCT Pub. Date: Aug. 5, 1999

(30) Foreign Application Priority Data

Jan. 31, 1998 (GB) .................................................. 9802064

(51) Int. Cl.[7] .................................................... G01D 5/34
(52) U.S. Cl. ................. 250/231.13; 250/231.15
(58) Field of Search ................. 250/231.13, 231.15, 250/231.14, 234, 236, 237 R, 237 G; 73/862.08, 862.23

(56) References Cited

U.S. PATENT DOCUMENTS

| 4,678,908 | 7/1987 | LaPlante | 250/231.13 |
| 4,866,268 | 9/1989 | Tang et al. | 250/231.13 |
| 5,523,561 | * 6/1996 | Ironside et al. | 250/231.1 |
| 5,841,132 | 11/1998 | Horton et al. | 250/231.13 |

FOREIGN PATENT DOCUMENTS 0 555 987 A2  8/1993  (EP) .

* cited by examiner

*Primary Examiner*—Que T. Le
(74) *Attorney, Agent, or Firm*—Cesari and McKenna

(57) ABSTRACT

A combined torque and angular position detector includes two disks rotatable about a common axis. Relative angular displacement of the disks results from torque applied thereto. Each disk has a number of regions of differing optical transmissivity and these control the transmission of optical radiation from a source to an array on which an image of the regions of the disks is formed. A data processor processes image intensity data and determines the angular positions of the disks and their relative displacement. Alternative arrangements are descried in which positional information is derived by providing one disk regions of intermediate transmissivity of width varying around one disk, by having the regions of lesser transmissivity of width varying around one disk or by arranging combinations of regions of several different widths around one disk.

12 Claims, 16 Drawing Sheets

FIG 6
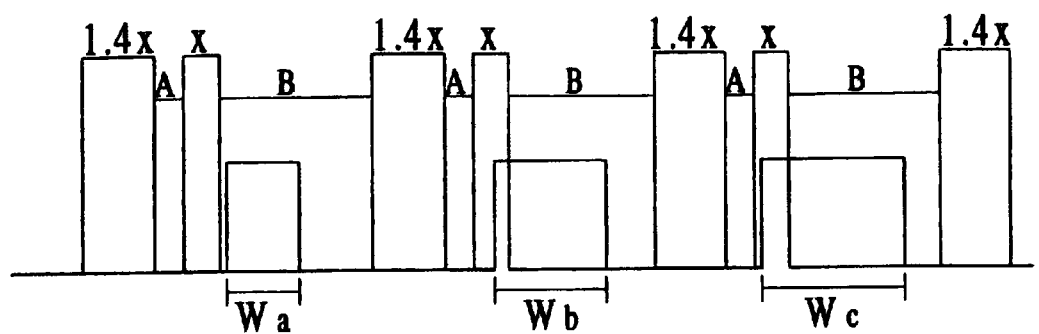
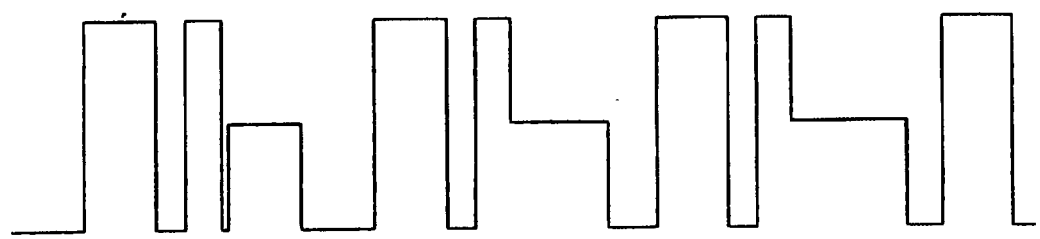
(b) |−−−−−−−−−−−−−−−|
(c)   |−−−−−−−−−−−−−−−|
(d)     |−−−−−−−−−−−−−−−|
(e)       |−−−−−−−−−−−−−−−|
(f)         |−−−−−−−−−−−−−−−|
(g)           |−−−−−−−−−−−−−−−|
(h)             |−−−−−−−−−−−−−−−|
(i)               |−−−−−−−−−−−−−−−|
(j)                 |−−−−−−−−−−−−−−−|

FIG 14

Code Sequence for 72-element Torque Sensor

| | | | |
|---|---|---|---|
| abbb | abbd | babb | badb |
| bbac | bdad | bbca | dbda |
| accb | addc | cabc | dacd |
| cbab | dcac | bcba | cdca |
| abdd | accd | badd | cadc |
| ddad | cdab | ddda | dcba |
| adcc | abcb | dacc | babc |
| ccac | cbac | ccca | bcca |
| acdb | acdc | cabd | cacd |
| dbac | dcad | bdca | cdda |
| acbc | addb | cacb | dabd |
| bcad | dbad | cbda | bdda |
| adcd | adcb | dadc | dabc |
| cdad | cbad | dcda | bcda |
| adbd | adbb | dadb | dabb |
| bdac | bbab | dbca | bbba |
| acbd | abcc | cadb | bacc |
| bdab | ccba | dbba | ccab | n.b. at zero torque, A = B

FIG 16
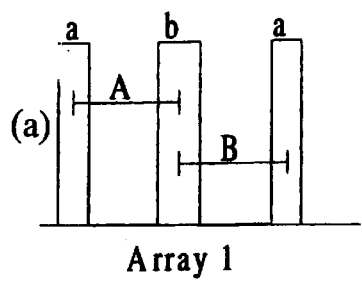
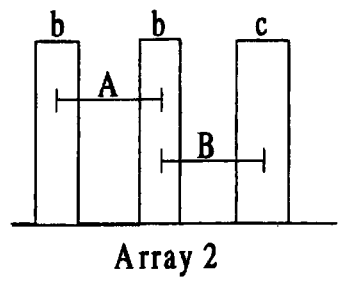
(a) Array 1 — Array 2 — Code Sequence : abbb
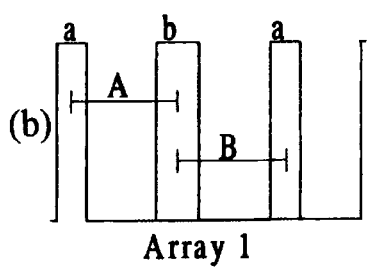
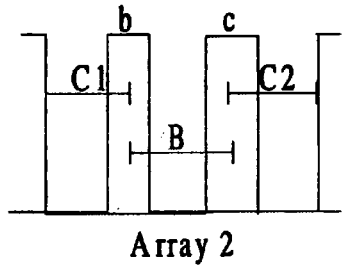
(b) Array 1 — Array 2 — Code Sequence : bbac
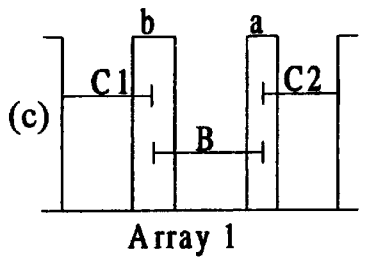
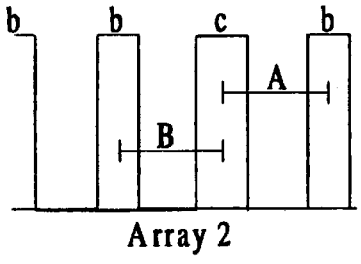
(c) Array 1 — Array 2 — Code Sequence : bbac
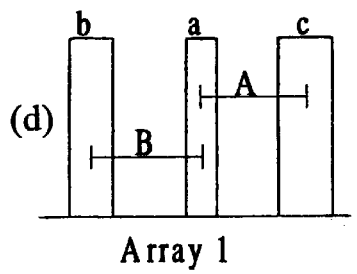
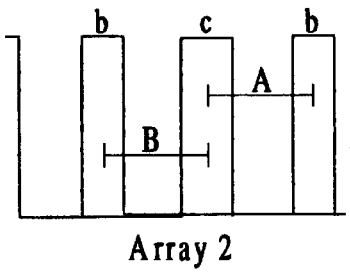
(d) Array 1 — Array 2 — Code Sequence : bbac
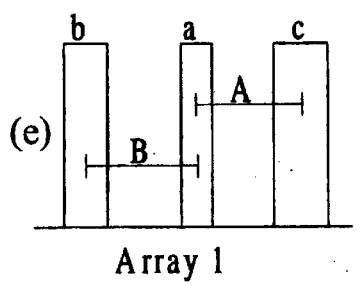
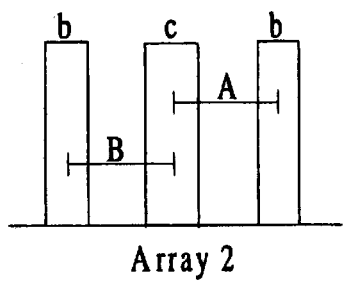
(e) Array 1 — Array 2 — Code Sequence : bbac FIG 19
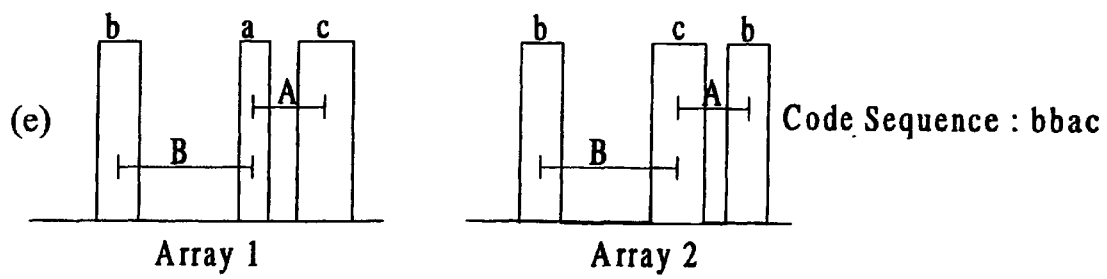
(e) Code Sequence : bbac
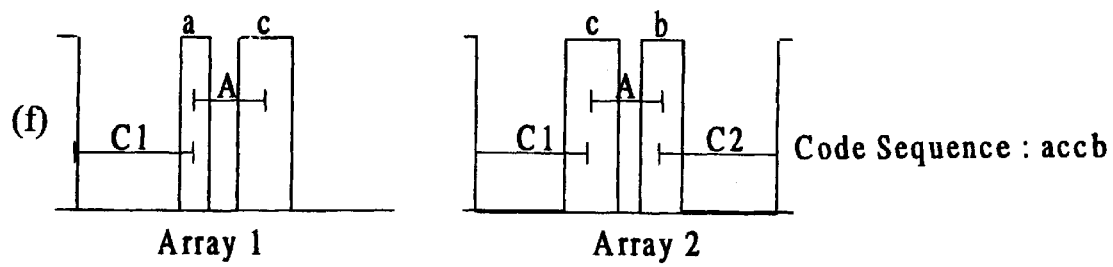
(f) Code Sequence : accb
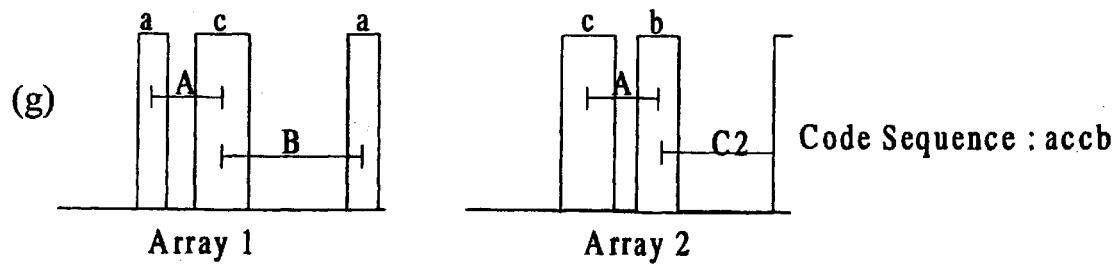
(g) Code Sequence : accb
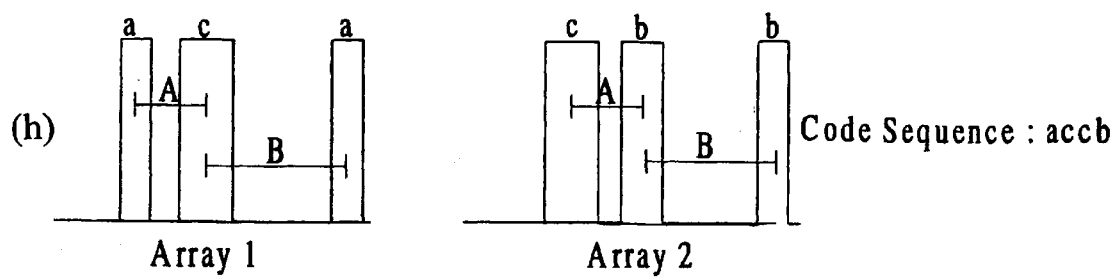
(h) Code Sequence : accb

COMBINED TORQUE AND ANGULAR POSITION SENSOR

This invention relates to a combined torque and angular position sensor for use, for example, in an electrical power assisted steering system (EPAS).

WO95/06330 discloses a torque sensor in which there are two relatively movable rotary elements which each have alternating first and second regions of differing transmissivities, such regions acting to modulate optical radiation from a source to form an image on an optical sensor array. Data taken from the array is analysed by a data processor to determine the relative positions of the two rotary elements by detecting the widths of gaps between a first dark area created by a low transmissivity region on one rotary element and dark areas on opposite sides of the first dark area, such dark areas being created by two adjacent low transmissivity regions on the other rotary element.

In an EPAS system it is also necessary for the current absolute position of the rotary elements to be known and in WO95/06330 an arrangement is described in which a number of the low transmissivity regions on one rotary element is of width different from the remainder, so that an "index" position can be established when these regions are detected. It has been found that a single different low transmissivity region is sufficient for this purpose, but when the system is initially switched on the rotary elements may have to be turned through up to 180° to enable the index position to be detected.

It is an object of the present invention to provide a combined torque and angular position sensor in which the absolute position can be established without requiring any turning of the rotary elements at start-up.

SUMMARY OF THE INVENTION

In accordance with one aspect of the present invention there is provided a combined torque and angular position detector comprising a source of optical radiation, an array of optical sensors, first and second elements interposed between the source and the array, said elements being rotatable together and also angularly movable relative to one another to a limited extent for torque measurement, said first and second elements each having a plurality of alternating first and second regions, the first regions having greater optical transmissivities than the second regions, said second element also having further regions of optical transmissivity intermediate the transmissivities of the first and second regions, said further regions each being of different angular width, and a data processor arranged to collect optical intensity data from each of the sensors of the array and operating to process such data to determine the angular position of the second element by measuring the width and position of an image of a detected one of said further regions thereon, and the relative angular displacement of the first and second elements by measuring the position of the image of a second region of the second element relative to the positions of the images of two adjacent second regions of the first element.

Preferably, the positions of the images first and second regions are determined by comparing the optical intensity data for each sensor of the array with an upper threshold value. Positions of the further regions are determined by comparing the intensity data for each sensor of the array with a lower threshold value.

Preferably, the further regions of the second element are arranged to lie centrally within the first regions thereof.

The second element may be formed by laminating a mask which defines the first and second regions with a transparent overlay which has semitransparent areas forming the further regions.

In accordance with a second aspect of the invention there is provided a combined torque and angular position sensor comprising a source of optical radiation, an array of optical sensors illuminated by said source, first and second elements interposed between the source and the array, said first and second elements being rotatable together and angularly movable relative to one another to a limited extent for torque measurement, each of said first and second elements having a plurality of alternating first and second regions, said first regions having greater optical transmissivities than the second regions, the second regions of second element varying in angular width such that the angular widths of the first regions thereof decrease progressively around said second element, and a data processor connected to receive optical intensity data from each of the sensors of the array and operating to process such data to determine the angular position of the second element by measuring the position and width of the image of the second regions of the second element, and the relative angular displacement between the elements by measuring the position of an image of a second regions of the first element relative to the positions of images of two adjacent second regions of the second element.

The second regions of the second element are preferably arranged with their centre lines equi-angularly spaced around the element.

There are preferably two sensor arrays at diametrically opposite positions. In this case the second regions of the second element are preferably arranged mainly in adjacent pairs around the second element, the two second regions of each pair being of the same angular width. To avoid having a situation where each array can "see" only second regions of the same width as each other, the pairs are staggered by the inclusion of single second regions at non-opposite positions.

In accordance with a third aspect of the invention, there is provided a combined torque and angular position sensor comprising a source of optical radiation, an array of optical sensors illuminated by said source, first and second elements interposed between the source and the array, said first and second elements being rotatable together and also angularly movable relative to one another to a limited extent for torque measurement, each of the first and second elements having a plurality of alternating first and second regions, the first regions being of greater optical transmissivity than the second regions, whereby a combined image of a zone of said elements is formed on the array, the widths of said second regions differing from one another such that in any position of the first and second element, images of second regions having a unique combination of angular widths are present in the image, and a data processor connected to receive optical intensity data from each of the sensors of the array and operating on such data to determine a coarse measurement of the angular position of the elements by identifying which unique combination occurs in the image, a fine measurement of angular position in accordance with the position of the image of a selected second region within the sensitive image and the relative angular position of the elements by determining the position of the image of a second region of one element relative to the images of two adjacent second region of the other element.

Preferably to obtain sufficient data to identify the unique combinations and measure the angular position and relative angular displacement with a high level of resolution and accuracy it is desirable to utilise two sources and two sensor arrays at diametrically opposite positions relative to the common axis of the first and second elements.

BRIEF DESCRIPTION OF THE DRAWINGS

In the accompanying drawings:

FIGS. 6 and 7(a) to (j) show idealised "waveforms" corresponding to those shown in FIGS. 4 and 5(a) to (i) but with maximum torque present;

FIG. 14 is a chart showing a sequence of codes which are obtained in this third embodiment of the invention for coarse determination of angular position;

FIGS. 16(a) to (e) is a set of idealised waveforms derived from those shown in FIG. 15 showing the effect of relatively small changes in the relative position of the sensor arrays and indicated in lines (a) to (h) in FIG. 17;

FIGS. 18(a) to (d) and 19(e) to (h) correspond to FIGS. 16(a) to (e) in the full torque condition.

DETAILED DESCRIPTION OF THE DRAWINGS

Figure 1:
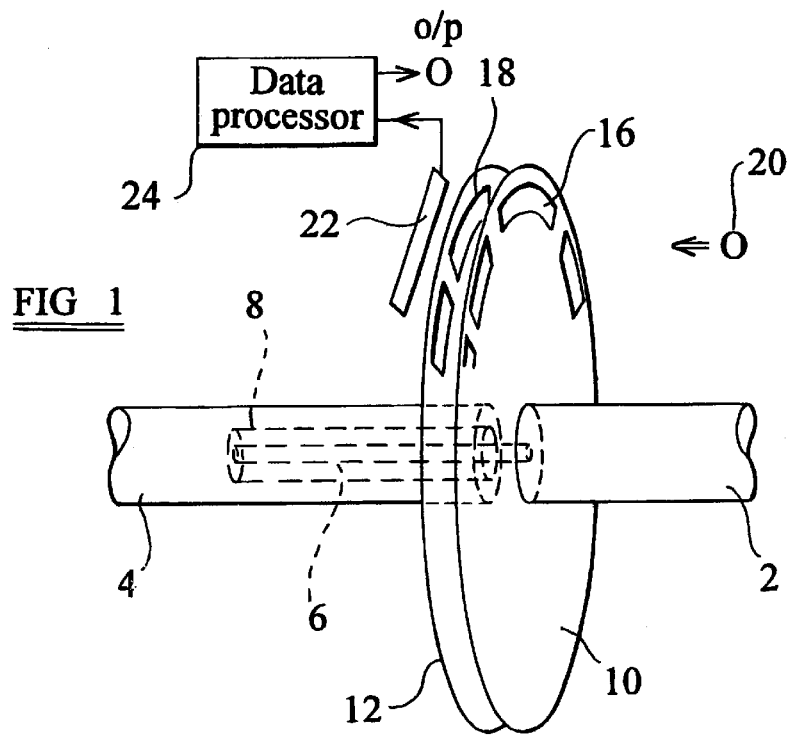
FIG. 1 is a diagram showing the general features of a combined torque and angular position detector of the type to which the present invention relates.
Figure 2:
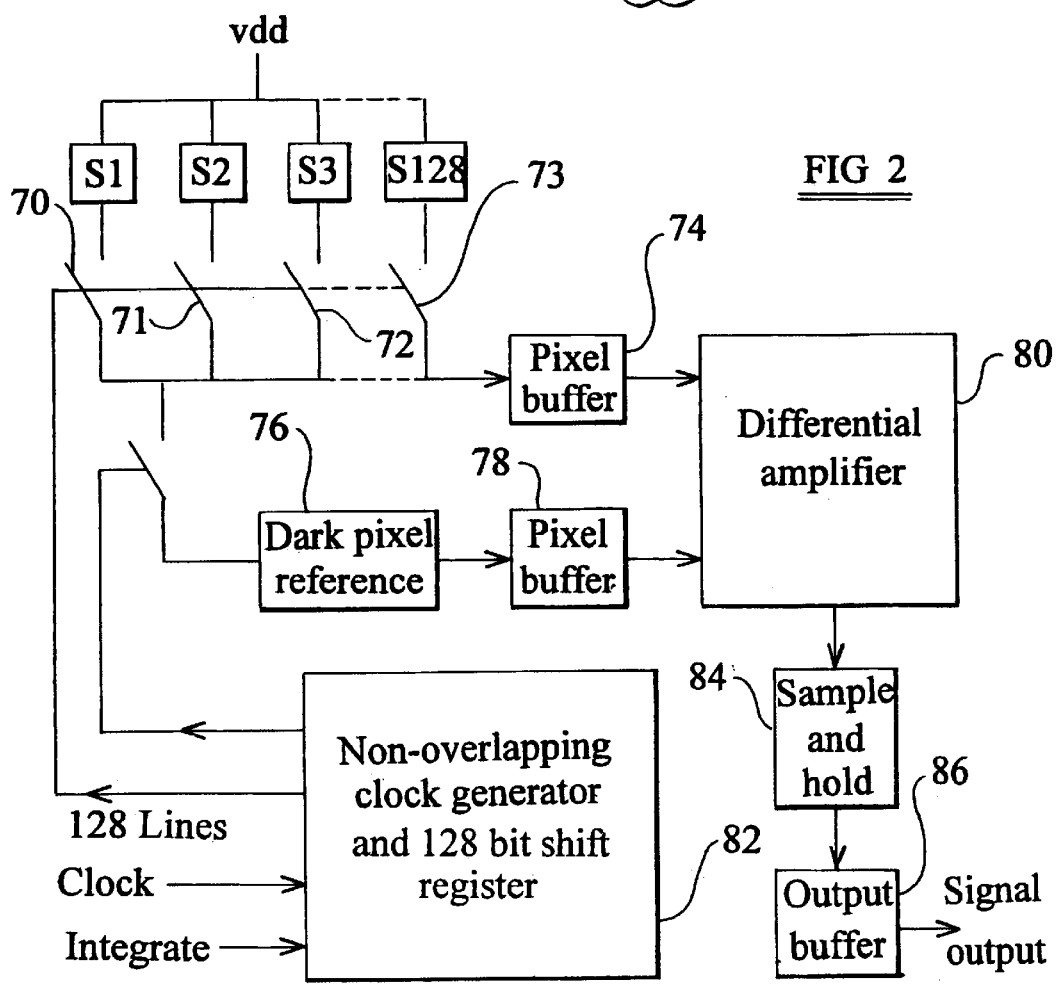
FIG. 2 is a block diagram of circuitry provided for loading data from each sensor of a sensor array included in FIG. 1 into a data processor.

The basic structure of the combined torque and angular position sensors described below is shown in FIG. 1 which is the same as FIG. 1 of WO96/06330, the description of which may be referred to for a full understanding of the operation of the sensor.

Basically the sensor includes two side-by-side disk elements 10, 12 respectively mounted on two aligned shafts 2, 4 interconnected by a torsion bar 6 in a bore 8 in shaft 14. Each disk element 10, 12 is formed with an annular arrangement of arcuate slots 16, 18, the slots 16, 18 representing portions of the disk elements 10, 12 which have a higher optical transmissivity than the portions which separate the arcuate slots. In the following description these separating portions are referred to as "spokes". There are an equal number (e.g. 36) of equi-angularly spaced spokes on each disk element and those on one disk element have a greater angular width than those on the other element.

A light source 20 is provided on one side of the disks and an optical sensor array 20 is provided on the other. The spokes cast a shadow image on the sensor array and by reading optical intensity data from each sensor in the array 22 into a data processor 24 and processing this data it is possible to determine the angular displacement of one disk element relative to the other.

The light source 20 is a point source with a diffuser, so that the edges of the shadow image are somewhat blurred making it possible to determine edge positions to a high level of resolution than that which would otherwise be imposed by spacing of the sensors in the array 22.

Various errors are introduced into the intensity measurements taken because of variations in the sensitivity of the sensors in the array according to the angle of incidence of the light. Furthermore distortions are introduced by geometric features of the sensor, but, as explained in detail in WO96/06330, the data processor compensates for these errors and distortions and can produce linearised idealised "waveforms" which are effectively idealised snapshots of the image on the array.

The array used is a 128 pixel linear array which includes, as is usual 128 analog storage elements into which signals are fed simultaneously when a snapshot is taken. These signals are then read out sequentially into a differential amplifier 80 via a pixel buffer 74 under the control of a clock generator 82 controlling switches 70–73. The differential amplifier provides a signal indicating the difference between the pixel value and a "dark pixel" reference value 76 via a pixel buffer 78. The difference signal is stored in a sample and hold circuit 84 and is then transferred via an output buffer to an a/d converter (not shown) of the data processor. For each snapshot 128 digital values are stored in the RAM of the processor for subsequent processing.

Figure 3:
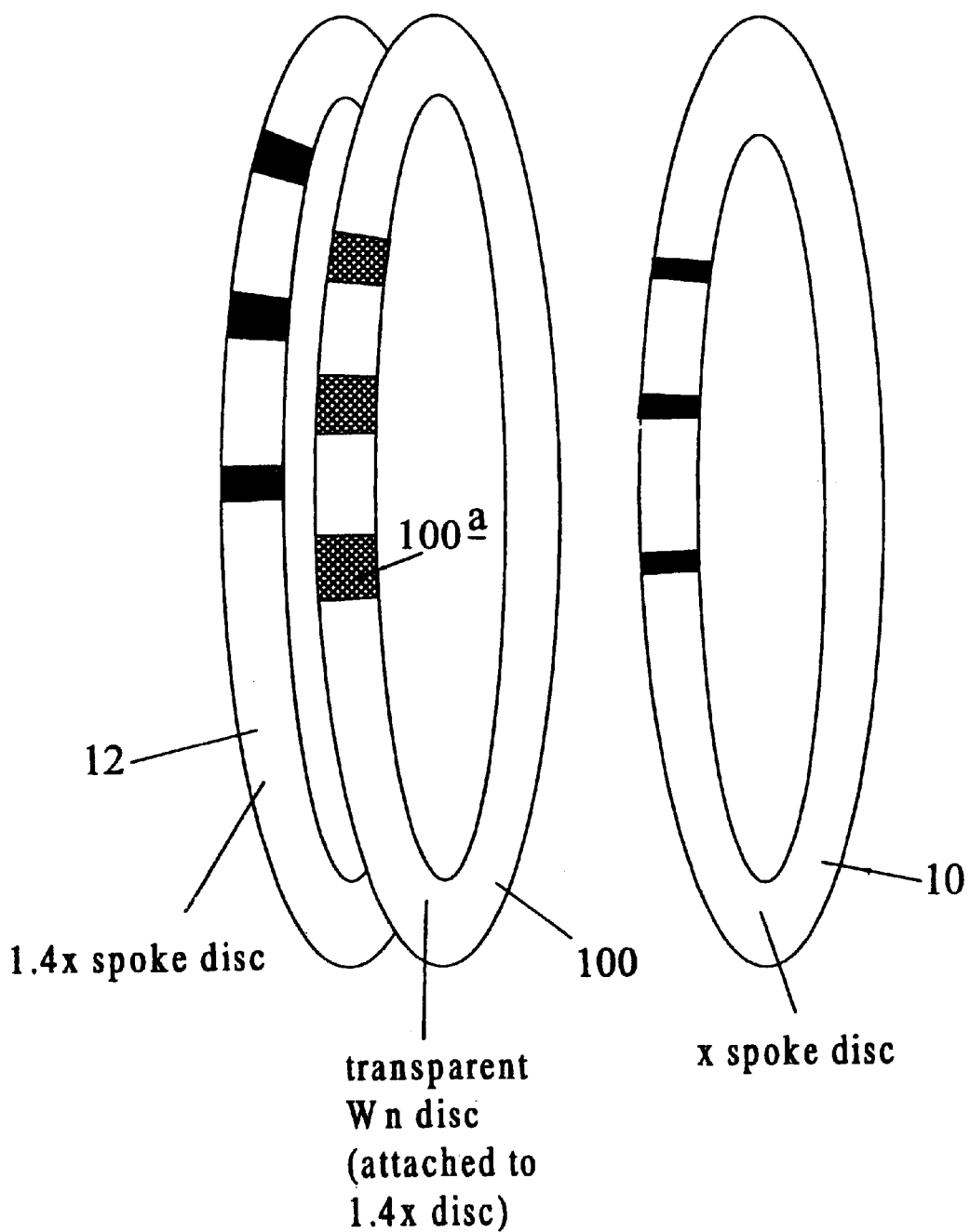
FIG. 3 is a diagrammatic representation of a modification of the sensor shown in FIG. 1 in accordance with the present invention.

Turning now to FIG. 3, the basic sensor of FIG. 1 is modified by the addition of a transparent annular overlay 100 which has semi-transparent zones 100a on it. The semi-transparent zones 100a are of progressively greater width around the overlay, but their centres are equi-angularly spaced. The overlay 100 is attached to the disk element 12 with the semi-transparent zones mid-way between the spokes of element 12. The spokes of the element 10 are of a basic width x subtending an angle of 1.2901° at the center of the disk. The spokes of disk element 12 are 1.4 times this width. The semi-transparent zones vary from 1.6x to 5.2x in steps of 0.1x.

Figure 4:
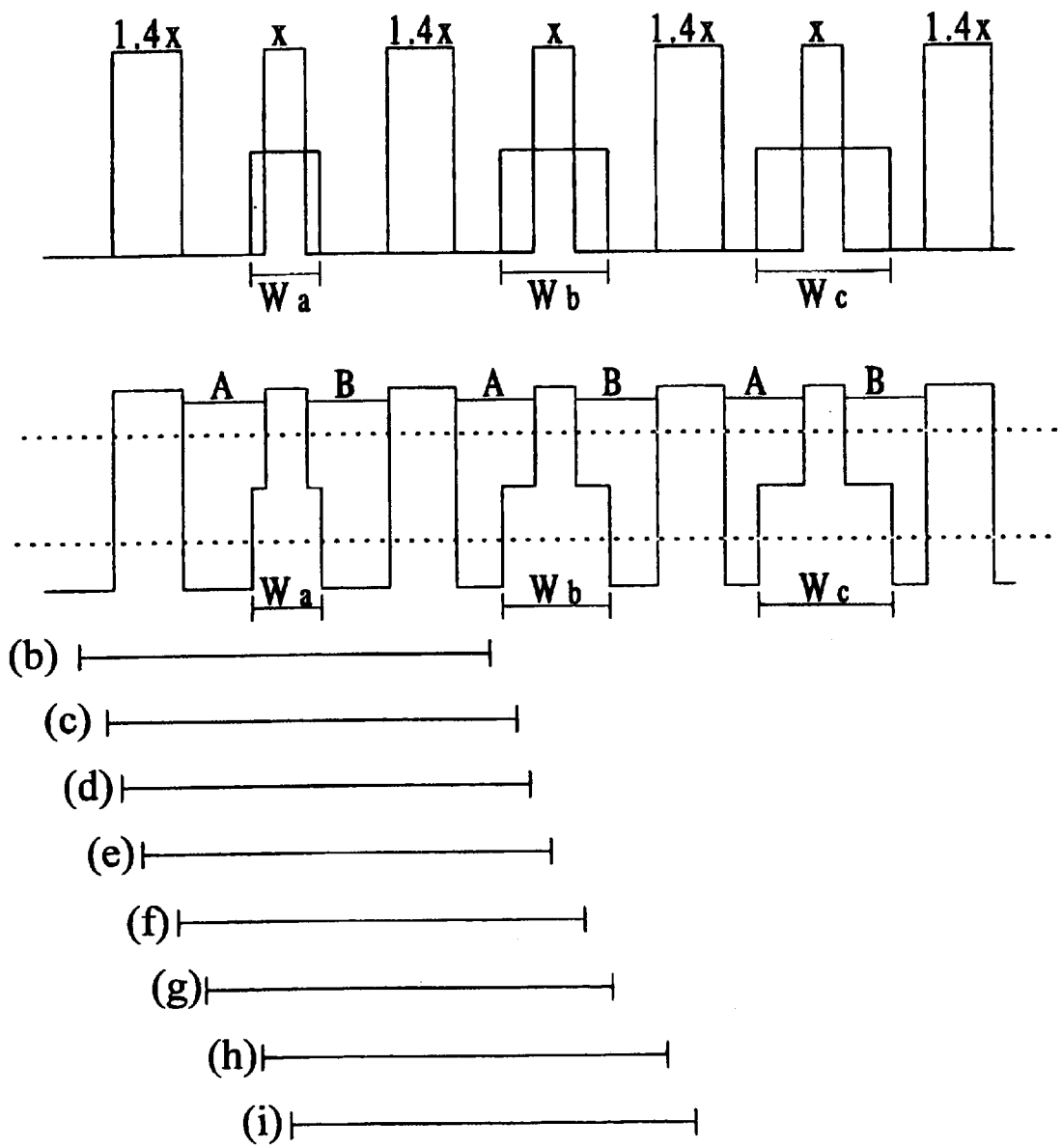
FIG. 4 shows idealised "waveforms" derived from the sensor array in a zero torque condition using the modification shown in FIG. 3.

FIG. 4 shows the idealised "waveform" derived by the processor from the data read from the array following a snap-shot, the peaks in the waveform representing the dark spaces detected. At zero torque, the "full height" portions are exactly as they would be in the basic design. The "half-height" portions created by the semi-transparent zones of the overlay 100 are shown as Wa, Wb, Wc. The processor can differentiate between full height and half height portions by performing two series of comparisons of the waveform with an upper reference level for torque determination and with a lower reference level for position determination.

Figure 5:
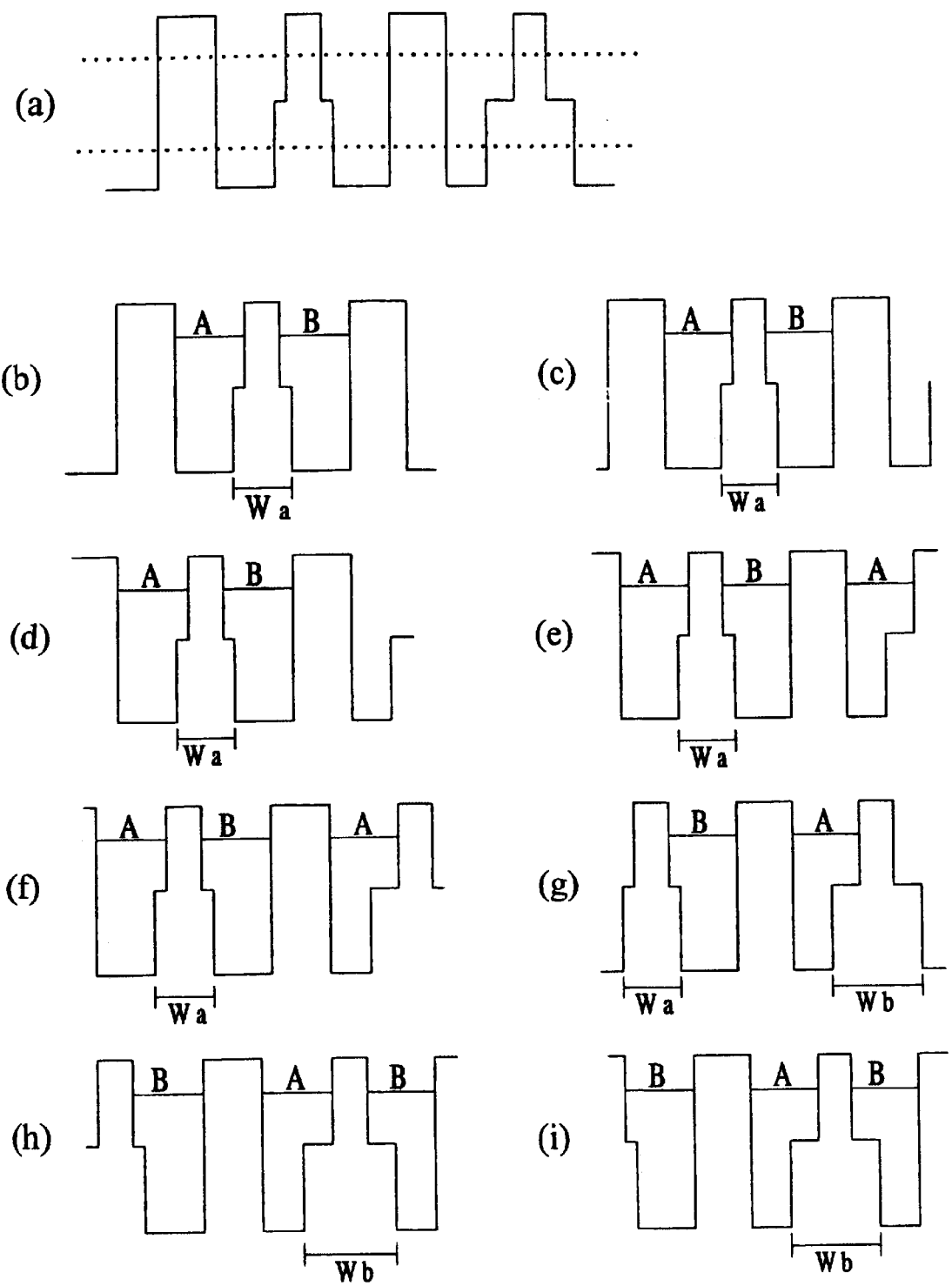
FIG. 5(a) shows idealised "waveforms" derived from those shown in FIG. 4.
FIGS. 5(b) to 5(i) showing the effect of small changes of position of the sensor elements relative to the sensor array as indicated by lines (b) to (i) in FIG. 4.

As shown in FIG. 5, in the zero torque condition, no matter what part of the waveform is visible to the sensor at the instant of the snapshot, the full width of a half height portion is always visible allowing the processor to determine which one of the semi-transparent zones is visible and to determine its exact position in the array window to allow angular position to the accurately calculated.

Figure 7:
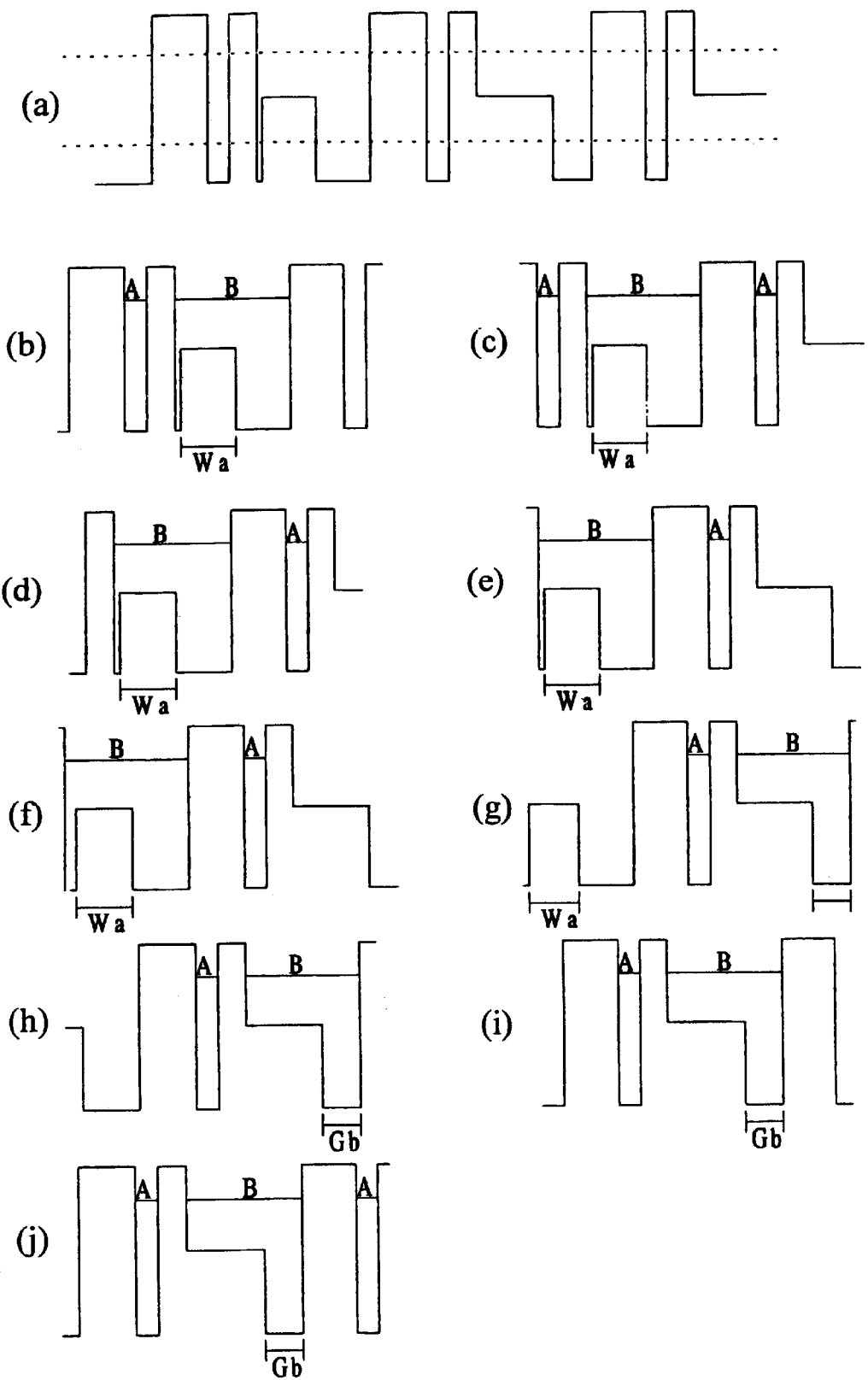

FIG. 6 shows the situation where full torque is applied. As in the basic sensor of FIG. 1, the processor can readily determine the relative displacement of the two disk elements relative to one another (and hence the torque). As shown in FIG. 7 it is always possible to identify the semi-transparent zone which is visible, either by direct measurement of its width or by measurement of the width of the gap following it when the leading edge is obscured by a full height spoke, or the gap preceding it when the trailing edge is so obscured.

Figure 8:
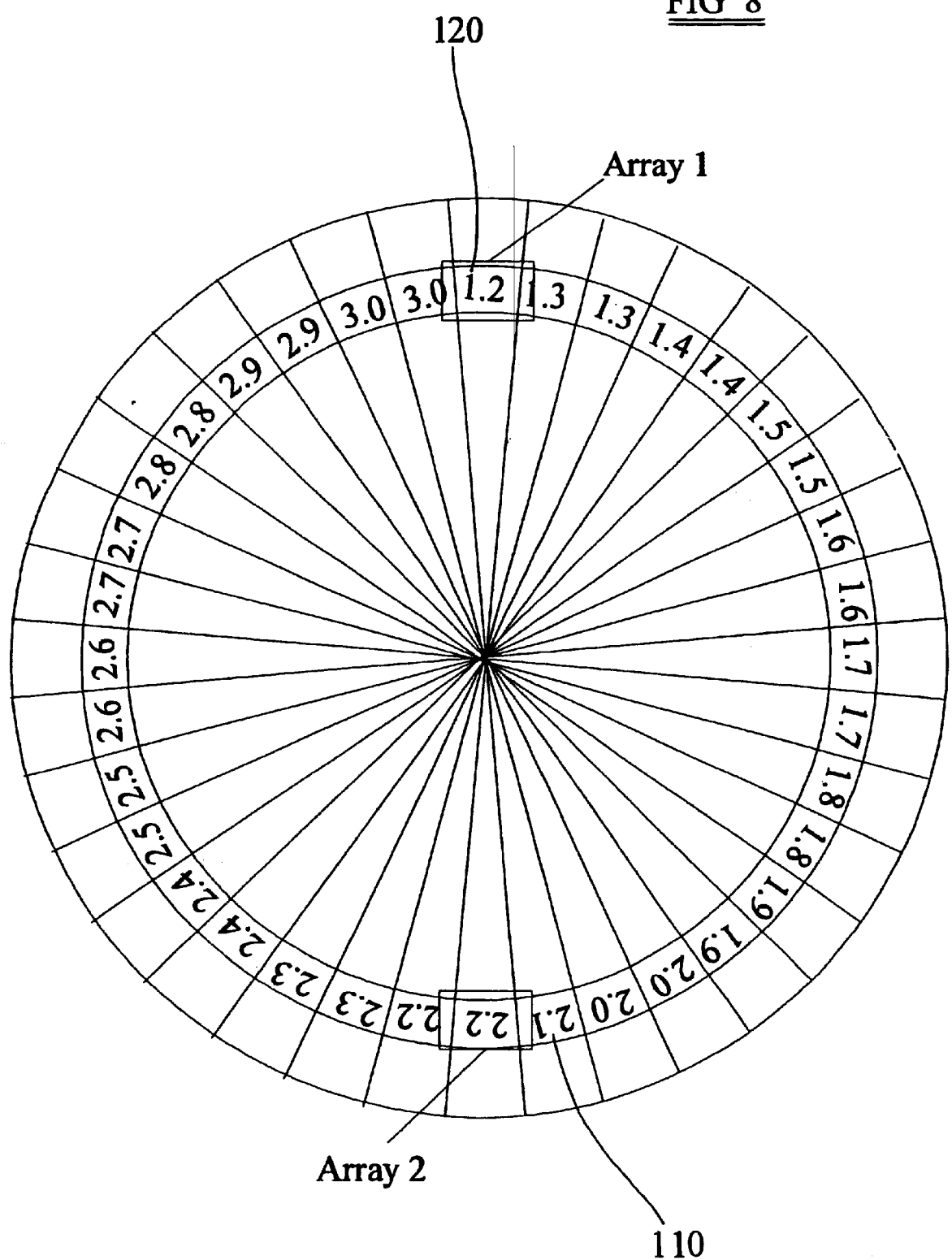
FIG. 8 is a diagram illustrating a second embodiment of the invention.
Figure 9:
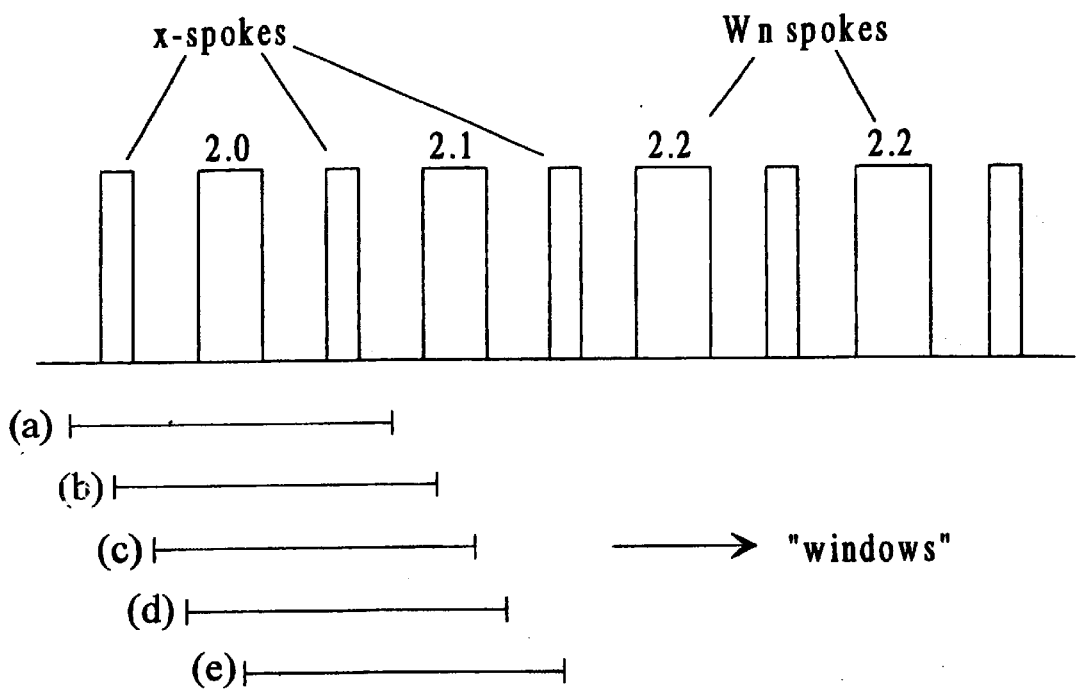
FIGS. 9 and 10(a) to (e) are idealised "waveforms" corresponding to those shown in FIGS. 4 and 5(a) to (i), but for the second embodiment.
Figure 10:
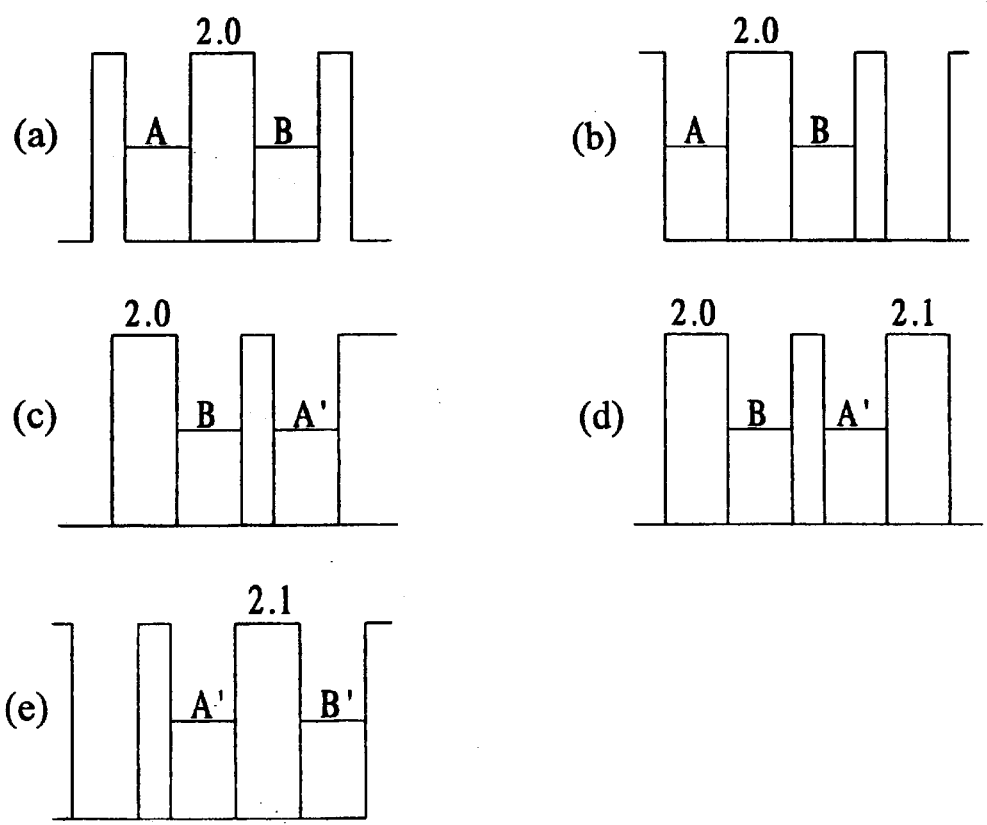
Figure 11:
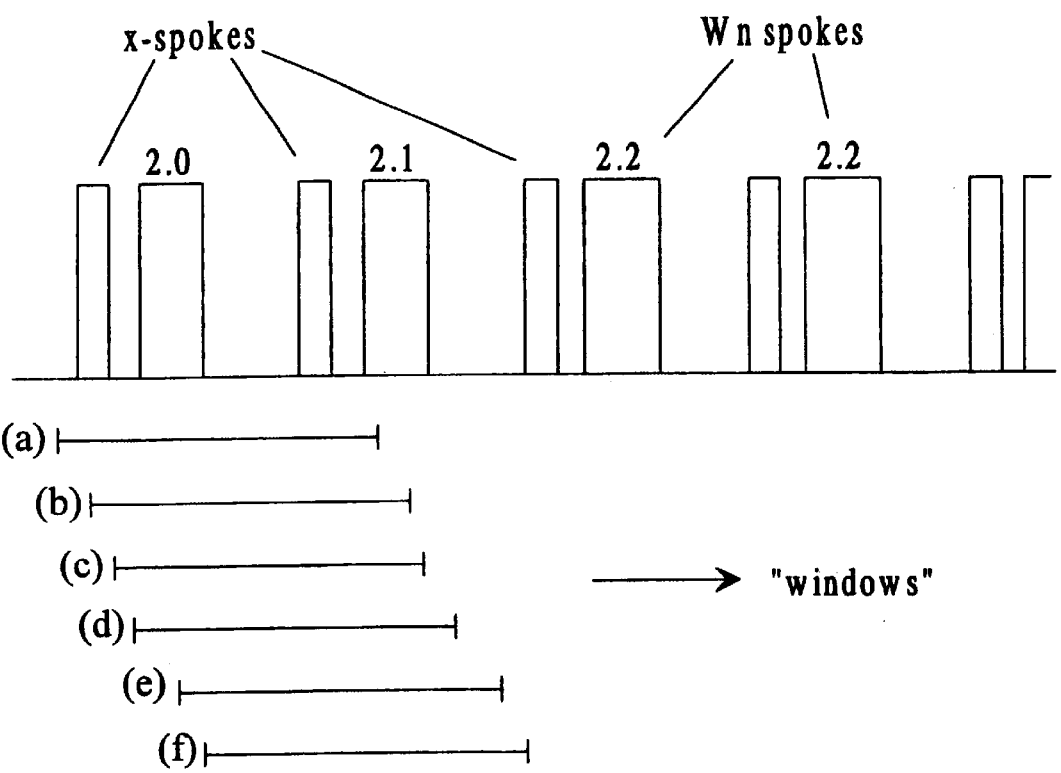
FIGS. 11 and 12(a) to (f) are idealised "waveforms" corresponding to FIGS. 6 and 7(a)to (j), but for the second embodiment.
Figure 12:
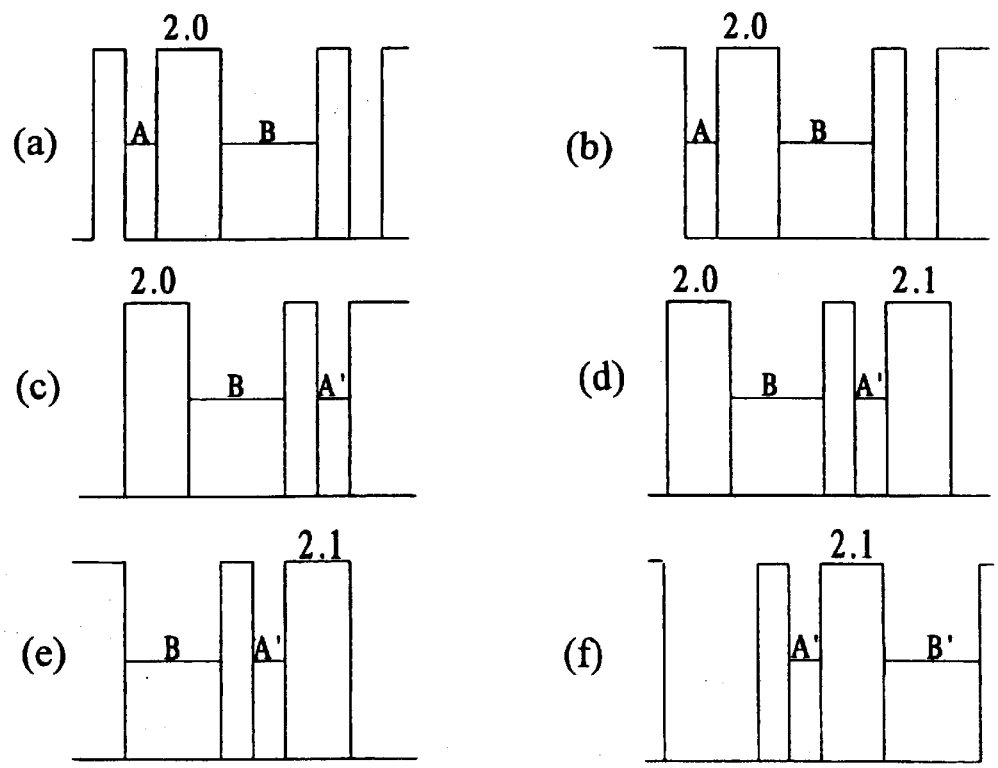

In the embodiment shown in FIG. 8, no transparent overlay is used. Instead, the spokes on the disk element 12 vary from 1.2x width to 3.0x width as shown diagrammatically. As shown an increment of 0.1x is applied to the width of alternate spokes, and this has the effect of making the gaps between spokes reduce progressively in the clockwise direction as viewed in FIG. 8. Two arrays are employed at diametrically opposite positions and to ensure that a situation cannot occur where the only spokes which can be seen by each array, the pairs of spokes are staggered by the inclusion of two single spokes 110, 120 at non-opposite positions.

Figure 13:
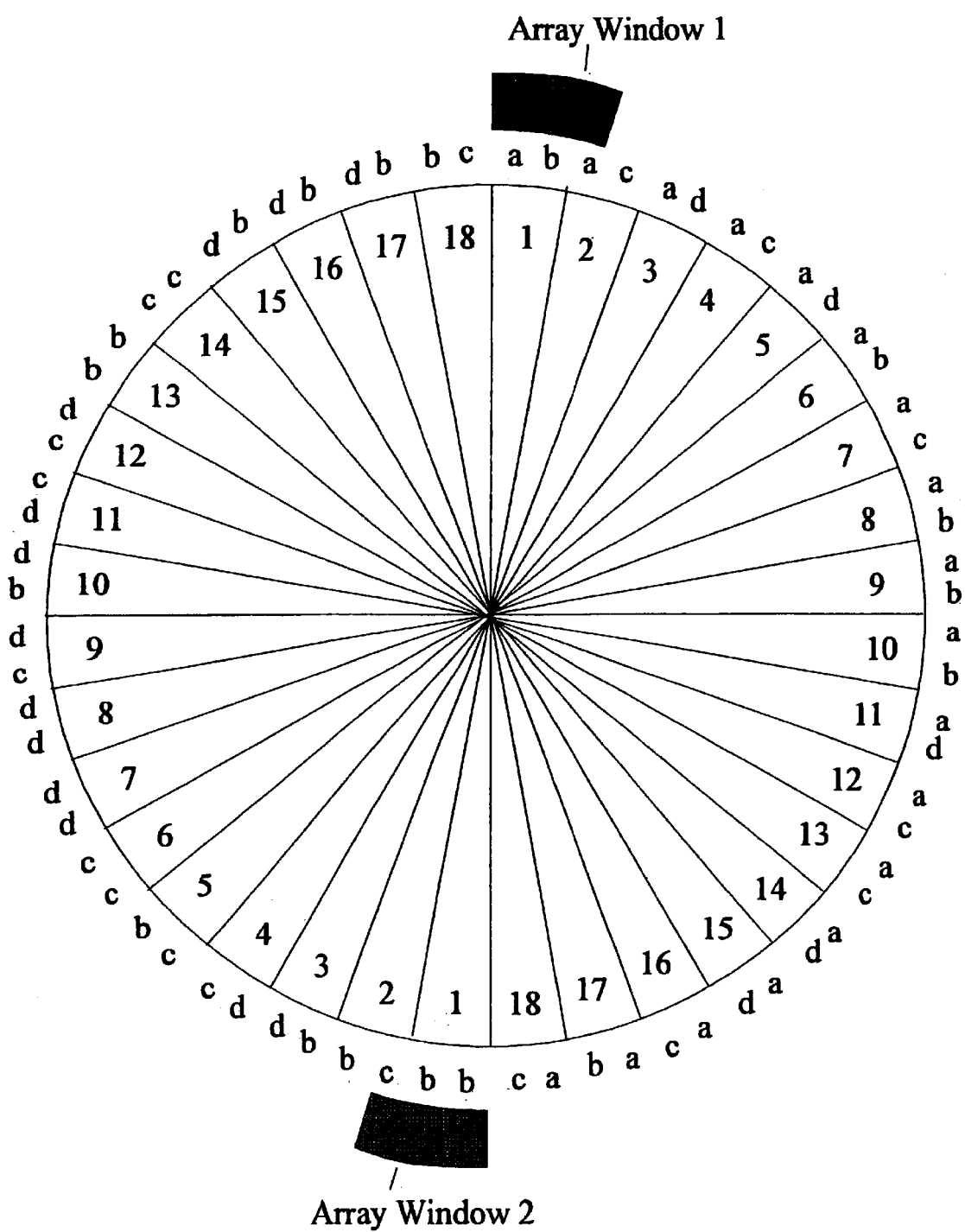
FIG. 13 is an illustration showing a third embodiment of the invention.

The zero torque and maximum torque waveforms of FIGS. 9 to 12 show that wherever the array windows are located at the time of the snapshot it is always possible to determine the ratio between the gaps to determine the torque and the width of a spoke to identify the coarse position of the dark elements. The processor can use the variable spoke width data and the gap data to determine the torque and absolute position accurately. In the arrangement shown in FIG. 13, four different widths of spokes are used on the two disk elements 10, 12. The spoke widths are a=x, b=1.2x, c=1.4x and d=1.6x. The spokes on the two disk elements occur in the following sequences;

Disk 10 aaaaaaaaaaaaaaaaaabcbdccddcbdcbcdddb
Disk 12 bcdcdbcbbbdccddcbcbbdcbcddddcdbcbbbc FIG. 13 actually shows for each of 36 segments of the disc elements the spoke width which appears on the two disk elements.

Two diametrically opposite arrays are used, each with its own separate light source. Once the spoke signals have been normalised and corrected the order of visible spokes is established by constructing a code by reading spoke widths alternatively from the waveforms for the two array windows. The resulting table of codes is s shown in FIG. 14.

Figure 15:
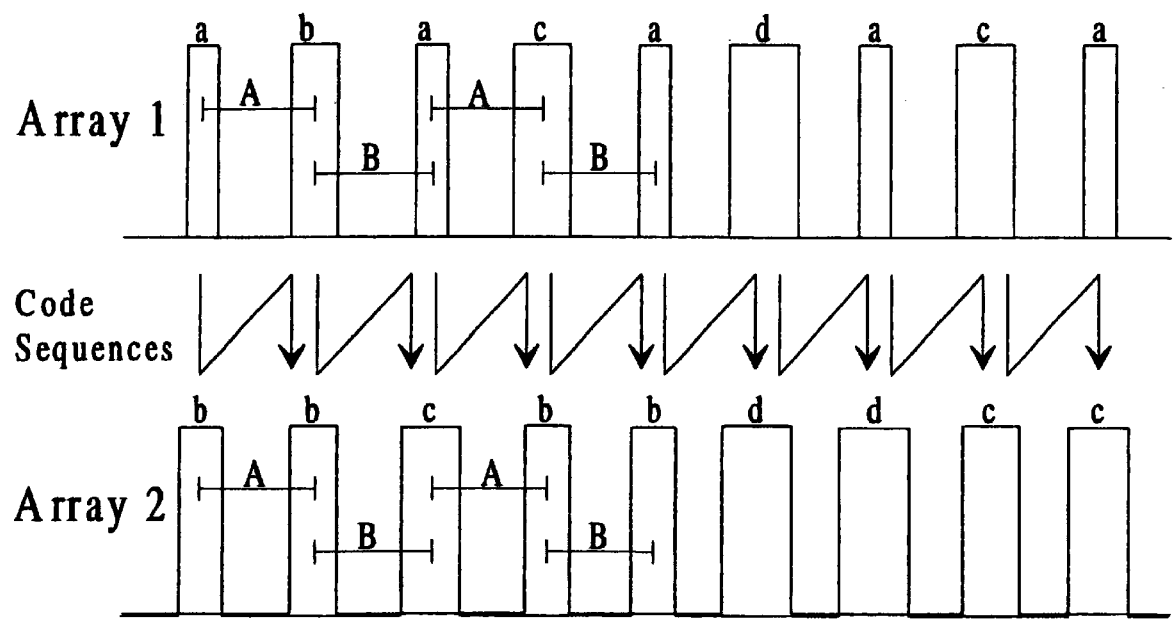
FIG. 15 is a set of idealised "waveforms" derived from the sensor arrangement shown in FIG. 13 at zero torque.
Figure 17:
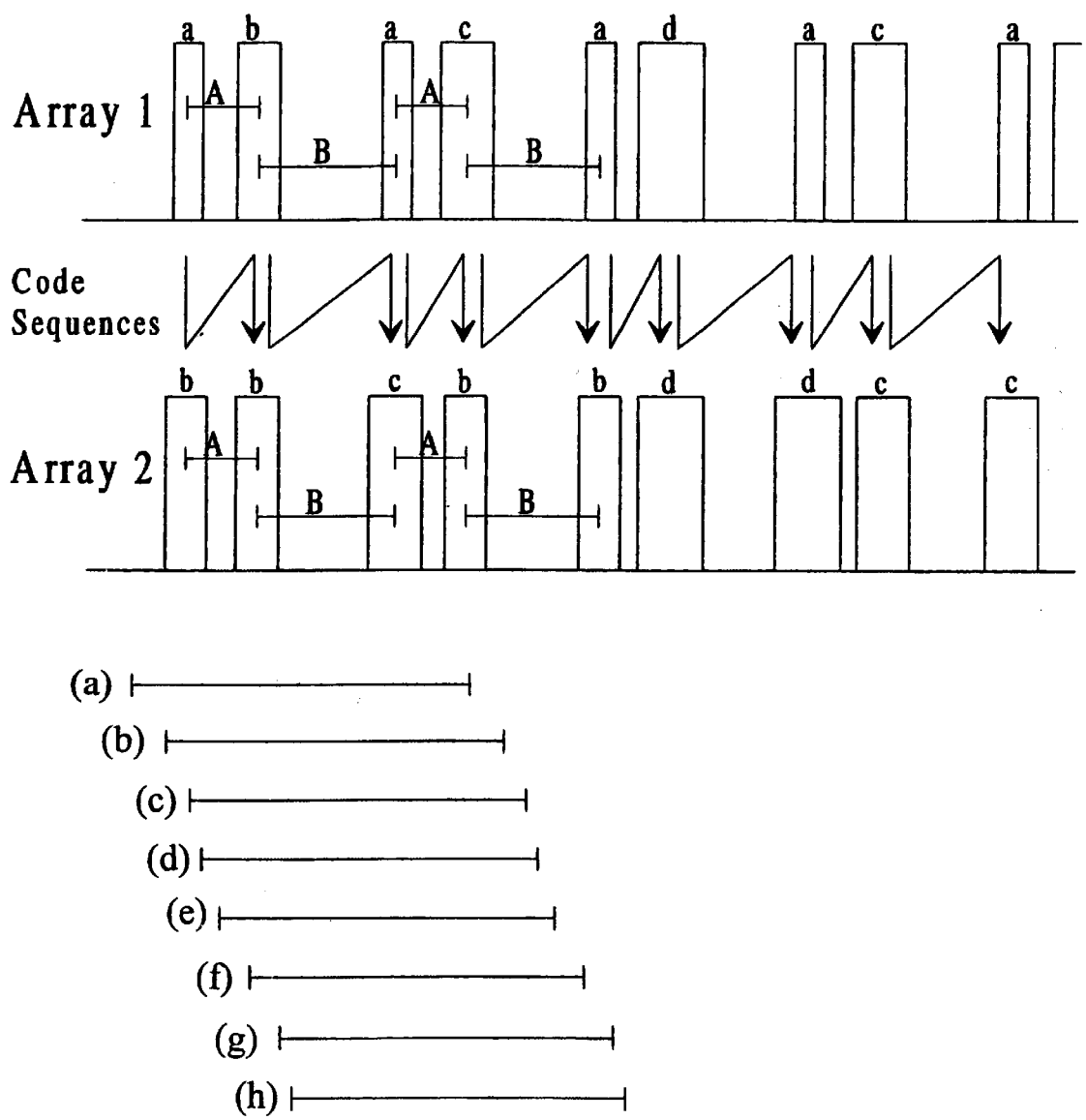
FIG. 17 is a view like FIGS. 5(a) to (i) for the maximum torque condition.
Figure 18:
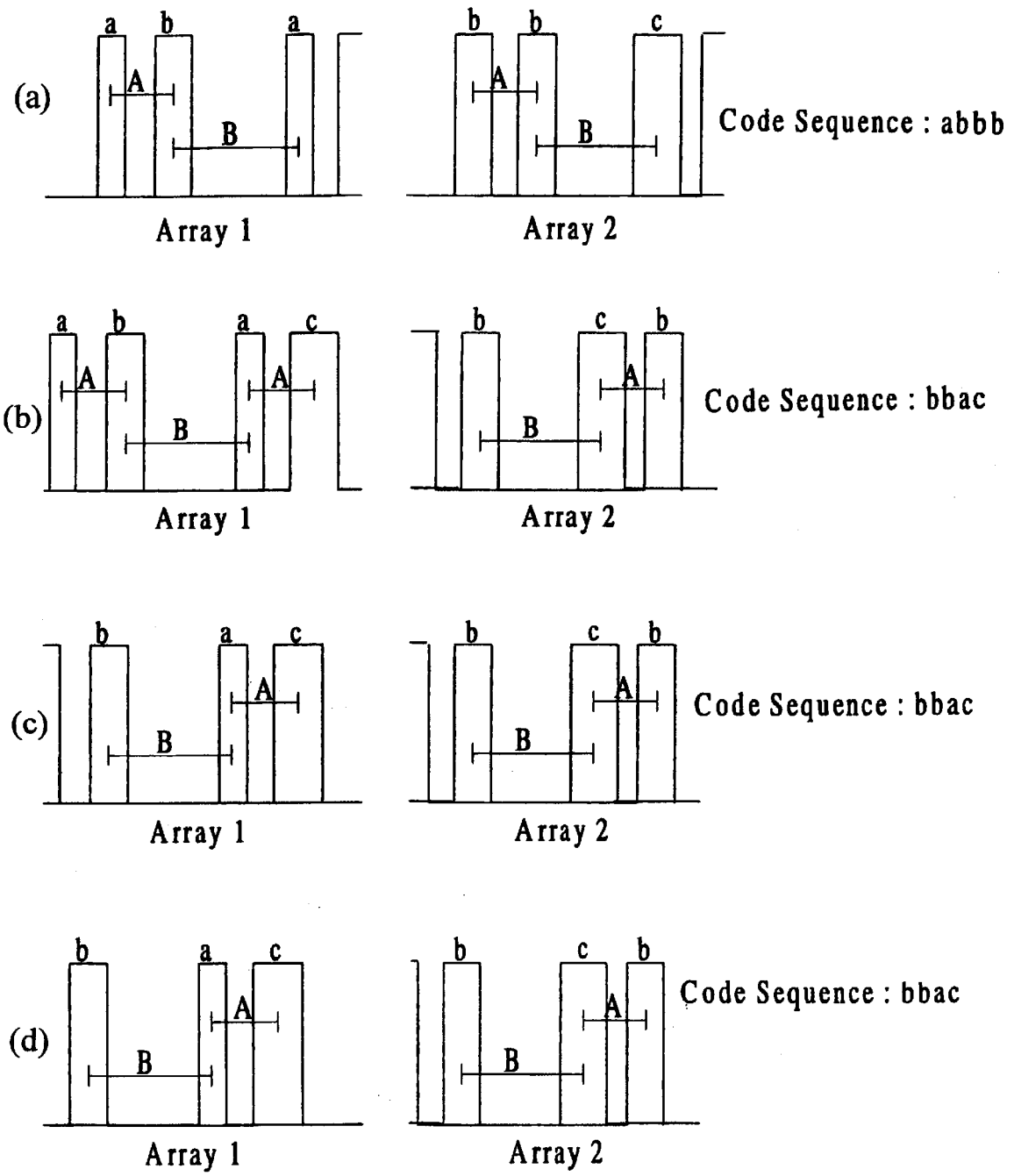

FIG. 15 shows idealised waveforms for the two arrays at zero torque. Different array window positions at the instant of the snapshots result in the differing situations shown in FIG. 16 which shows how a unique code sequence for the current angular position is determined.

Variations in torque do not change the code sequence as overlapping of spokes is prohibited by limiting the torque induced displacement. If the disks are turned "together" the observed 4-element code changes accordingly. At least 5 spoke edges are always visible on each of the arrays, so that at least two complete spokes are visible on each array. With an even number r (i.e. 36) windows and the arrays opposite it can be ensured that the visible spokes correspond with each other, in order to create the correct "composite" code. Each code includes one spoke "a" so that it is possible to distinguish between the disk elements as only disk element 10 has "a" spokes. The coarse disk element position is ascertainable to within 5° simply from the codes, fine position data being calculated as in the previous embodiments in terms of the exact position of the spoke image in the window.

In assigning the position code, where a particular spoke in one window is opposite a wider spoke in the other it is possible that one or other of the edges of the wider spoke may be just outside the array window. See, for example, FIG. 16(b) where a complete "a" spoke appear in the array 1 image, but the corresponding "b" spoke is only partially within the array 2 image. This situation is recognised by the processor which takes into account only complete spoke pair images and assigns the correct code bbac, rather than abbc—i.e. the first "a" spoke is ignored.

What is claimed is:

1. A combined torque and angular position detector comprising a source of optical radiation, an array of optical sensors, first and second elements interposed between the source and the array, said elements being rotatable together and also angularly movable relative to one another to a limited extent for torque measurement, said first and second elements each having a plurality of alternating first and second regions, the first regions having greater optical transmissivities than the second regions, said second element also having further regions of optical transmissivity intermediate the transmissivities of the first and second regions, said further regions each being of different angular width, and a data processor arranged to collect optical intensity data from each of the sensors of the array and operating to process such data to determine the angular position of the second element by measuring the width and position of an image of a detected one of said further regions thereon, and the relative angular displacement of the first and second elements by measuring the position of the image of a second region of the second element relative to the positions of the images of two adjacent second regions of the first element.

2. A detector as claimed in claim 1 in which said data processor determines the positions of the images of said first and second regions by comparing the optical intensity data for each sensor of the array with an upper threshold value.

3. A detector as claimed in claim 2 in which said data processor determines the positions of the images of said further regions by comparing the intensity data for each sensor in the array with a lower threshold value.

4. A detector as claimed in any one of claims 1 to 3 in which said further regions of said second element are arranged to lie centrally within respective ones of the first regions thereof.

5. A detector as claimed in any one of claims 1 to 3 in which the second element comprises a first mask defining said first and second regions laminated with a transparent overlay which has semi-transparent areas forming said further regions.

6. A combined torque and angular position sensor comprising a source of optical radiation, an array of optical sensors illuminated by said source, first and second elements interposed between the source and the array, said first and second elements being rotatable together and angularly movable relative to one another to a limited extent for torque measurement, each of said first and second elements having a plurality of alternating first and second regions, said first regions having greater optical transmissivities than the second regions, the second regions of second element varying in angular width such that the angular widths of the first regions thereof decrease progressively around said second element, and a data processor connected to receive optical intensity data from each of the sensors of the array and operating to process such data to determine the angular position of the second element by measuring the position and width of the image of the second regions of the second element, and the relative angular displacement between the elements by measuring the position of an image of a second regions of the first element relative to the positions of images of two adjacent second regions of the second element.

7. A detector as claimed in claim 6 in which said second regions of the second element have centre lines which are equi-angularly spaced around said second element.

8. A detector as claimed in claim 7 in which there are two sensor arrays at diametrically opposite positions.

9. A detector as claimed in claim 8 in which the second regions of the second element are arranged mainly in adjacent pairs around the second element, the two second regions of each pair being of the same angular width.

10. A detector as claimed in claim 9 in which the pairs of regions are staggered relative to one another by the inclusion of two single second regions at non-opposite positions.

11. A combined torque and angular position sensor comprising a source of optical radiation, an array of optical sensors illuminated by said source, first and second elements interposed between the source and the array, said first and second elements being rotatable together and also angularly movable relative to one another to a limited extent for torque measurement, each of the first and second elements having a plurality of alternating first and second regions, the first regions being of greater optical transmissivity than the second regions, whereby a combined image of a zone of said elements is formed on the array, the widths of said second regions differing from one another such that in any position of the first and second element, images of second regions having a unique combination of angular widths are present in the image, and a data processor connected to receive optical intensity data from each of the sensors of the array and operating on such data to determine a coarse measurement of the angular position of the elements by identifying which unique combination occurs in the image, a fine measurement of angular position in accordance with the position of the image of a selected second region within the sensitive image and the relative angular position of the elements by determining the position of the image of a second region of one element relative to the images of two adjacent second region of the other element.

12. A detector as claimed in claim 11 in which two sources and two arrays are provided at diametrically opposite positions relative to the common axis of the first and second elements.

* * * * *